United States Patent
Zhang et al.

(10) Patent No.: US 10,203,899 B2
(45) Date of Patent: Feb. 12, 2019

(54) METHOD FOR WRITING DATA INTO FLASH MEMORY APPARATUS, FLASH MEMORY APPARATUS, AND STORAGE SYSTEM

(71) Applicant: HUAWEI TECHNOLOGIES CO., LTD., Shenzhen, Guangdong (CN)

(72) Inventors: Chenyi Zhang, Shenzhen (CN); Chungong Lin, Chengdu (CN); Mingchang Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 487 days.

(21) Appl. No.: 14/979,000

(22) Filed: Dec. 22, 2015

(65) Prior Publication Data

US 2016/0110107 A1 Apr. 21, 2016

Related U.S. Application Data

(63) Continuation of application No. PCT/CN2014/080998, filed on Jun. 27, 2014.

(51) Int. Cl.
*G06F 3/06* (2006.01)
*G06F 12/02* (2006.01)

(52) U.S. Cl.
CPC ............ *G06F 3/064* (2013.01); *G06F 3/0604* (2013.01); *G06F 3/0679* (2013.01);
(Continued)

(58) Field of Classification Search
CPC ...... G06F 3/064; G06F 3/0604; G06F 3/0679; G06F 12/0246; G06F 2212/1032; G06F 2212/1244; G06F 2212/7204
See application file for complete search history.

(56) References Cited

U.S. PATENT DOCUMENTS 6,189,081 B1 2/2001 Fujio
7,783,851 B2 * 8/2010 Im .................. G06F 12/0246
711/103

(Continued)

FOREIGN PATENT DOCUMENTS

CN 101271429 A 9/2008
CN 101320594 A 12/2008
(Continued)

OTHER PUBLICATIONS

Park, Chanik, et al. "A reconfigurable FTL (flash translation layer) architecture for NAND flash-based applications." ACM Transactions on Embedded Computing Systems (TECS). (Year: 2008).*

*Primary Examiner* — Ramon A. Mercado
(74) *Attorney, Agent, or Firm* — Leydig, Voit & Mayer, Ltd.

(57) ABSTRACT

A flash memory apparatus for controlling storage of data comprises a plurality of blocks for storing data and a controller. Each block includes a plurality of pages. The controller receives first target data and identifies a first block to store the first target data. Then, the controller divides the first target data into two parts. A size of a first part is equal to the available capacity of the first block. And a size of a second part is equal to the size of the first target data minus the size of the first part. The controller further determines a second block that has stored data but is not full. At last, the controller writes the first part into the first block and write the second part into the second block.

9 Claims, 6 Drawing Sheets

(52) U.S. Cl.
CPC .. *G06F 12/0246* (2013.01); *G06F 2212/1032* (2013.01); *G06F 2212/1044* (2013.01); *G06F 2212/7204* (2013.01)

(56) References Cited

U.S. PATENT DOCUMENTS

| | | |
|---|---|---|
| 2007/0014397 A1 | 1/2007 | Ukeda et al. |
| 2008/0215911 A1 | 9/2008 | Chang |
| 2009/0049233 A1 | 2/2009 | Chen et al. |
| 2009/0259806 A1* | 10/2009 | Kilzer ................ G06F 12/0246 711/103 |
| 2010/0017557 A1 | 1/2010 | Nakanishi et al. |
| 2010/0095046 A1 | 4/2010 | Reid et al. |
| 2010/0146239 A1 | 6/2010 | Gabai et al. |
| 2010/0235605 A1 | 9/2010 | Perry et al. |
| 2011/0179217 A1 | 7/2011 | Hsiao |
| 2013/0073796 A1 | 3/2013 | Maeda |
| 2015/0120992 A1 | 4/2015 | Yamazoe et al. |

FOREIGN PATENT DOCUMENTS

| | | |
|---|---|---|
| CN | 101369251 A | 2/2009 |
| CN | 101464834 A | 6/2009 |
| CN | 101620513 A | 1/2010 |
| CN | 101727293 A | 6/2010 |
| CN | 102622306 A | 8/2012 |
| CN | 103106125 A | 5/2013 |
| CN | 103383690 A | 11/2013 |
| JP | H09-319645 A | 12/1997 |
| JP | 2011123830 A | 6/2011 |
| JP | 2012203508 A | 10/2012 |
| JP | 2013-69059 A | 4/2013 |
| JP | 2014-63358 A | 4/2014 |
| WO | 2013161398 A1 | 10/2013 |

* cited by examiner

METHOD FOR WRITING DATA INTO FLASH MEMORY APPARATUS, FLASH MEMORY APPARATUS, AND STORAGE SYSTEM

CROSS-REFERENCE TO RELATED APPLICATIONS

This application is a continuation of International Application No. PCT/CN2014/080998, filed on Jun. 27, 2014, which is hereby incorporated by reference in its entirety.

TECHNICAL FIELD

Embodiments of the present invention relate to the field of storage technologies, and in particular, to a method for writing data into a flash memory apparatus, a flash memory apparatus, and a storage system.

BACKGROUND

A flash memory apparatus is a non-volatile memory whose storage medium is a Flash unit, and has a characteristic that data does not disappear after a power outage. Therefore, the flash memory apparatus is widely used as an external or internal memory. A flash memory apparatus using a Flash unit as a storage medium may be a Solid State Device (SSD), which is also referred to as a Solid State Drive (SSD), or another memory.

One SSD generally includes multiple flash chips, and each flash chip includes several blocks, where each block further includes multiple pages. In some cases, a page that is damaged (also referred to as a damaged page) may occur in a block. When an SSD writes data into a block that includes a damaged page, if the block that includes a damaged page is insufficient to store the data, generally, a new block is found to store an overflow of the data. Therefore, in the SSD, there are a large number of blocks that have been written with some data but are not filled with data, which reduces space utilization of blocks, and causes a waste of storage space of the SSD.

SUMMARY

A method for writing data into a flash memory apparatus, a flash memory apparatus, and a storage system that are provided in embodiments of the present invention can improve space utilization of a block and save storage space of an SSD.

According to a first aspect, an embodiment of the present invention provides a flash memory apparatus, where the flash memory apparatus includes a primary controller and a flash chip, and the flash chip includes multiple blocks; and the primary controller is configured to: receive first target data; and when an effective capacity of a first block among the multiple blocks is less than a size of the first target data, divide the first target data into first part of the first target data and second part of the first target data, where a size of the first part of the first target data is the effective capacity of the first block, and a size of the second part of the first target data is the size of the first target data minus the size of the first part of the first target data;

determine a second block among the multiple blocks, where the second block is a block that has been written with data but is not filled with data; and write the first part of the first target data into the first block, and write the second part of the first target data into the second block.

In a first possible implementation manner of the first aspect, the second block is a preset block.

In a second possible implementation manner of the first aspect, the second block has a data flag, and the data flag is used to identify a block that has been written with data but is not filled with data; and the primary controller is specifically configured to determine the second block among the multiple blocks according to the data flag.

With reference to the second possible implementation manner of the first aspect, in a third possible implementation manner of the first aspect, the primary controller is further configured to: receive second target data; and when an effective capacity of a third block among the multiple blocks is less than a size of the second target data, divide the second target data into first part of the second target data and second part of the second target data, where a size of the first part of the second target data is the effective capacity of the third block, and a size of the second part of the second target data is the size of the second target data minus the size of the first part of the second target data; and write the first part of the second target data into the third block, and write the second part of the second target data into the second block; and add the data flag to the second block.

According to a second aspect, an embodiment of the present invention provides a flash memory apparatus, where the flash memory apparatus includes a primary controller and a flash chip, and the flash chip includes multiple blocks; and the primary controller is configured to: receive first target data, and write the first target data into a first block among the multiple blocks;

when the first block is filled with data, obtain data that is in the first target data and has not been written into the first block, where an effective capacity of the first block is less than a size of the first target data;

determine a second block among the multiple blocks, where the second block is a block that has been written with data but is not filled with data; and write, into the second block, the data that is in the first target data and has not been written into the first block.

In a first possible implementation manner of the second aspect, the second block is a preset block.

In a second possible implementation manner of the second aspect, the second block has a data flag, and the data flag is used to identify a block that has been written with data but is not filled with data; and the primary controller is specifically configured to determine the second block among the multiple blocks according to the data flag.

With reference to the second possible implementation manner of the second aspect, in a third possible implementation manner of the second aspect, the primary controller is further configured to: receive second target data, and write the second target data into a third block among the multiple blocks;

when the third block is filled with data, obtain data that is in the second target data and has not been written into the third block, where an effective capacity of the third block is less than a size of the second target data;

write, into the second block, the data that is in the second target data and has not been written into the third block; and add the data flag to the second block.

According to a third aspect, an embodiment of the present invention provides a method for writing data into a flash memory apparatus, where the flash memory apparatus includes a primary controller and a flash chip, and the flash chip includes multiple blocks; and the method includes:

receiving, by the primary controller, first target data; and when an effective capacity of a first block among the multiple blocks is less than a size of the first target data, dividing the first target data into first part of the first target data and second part of the first target data, where a size of the first part of the first target data is the effective capacity of the first block, and a size of the second part of the first target data is the size of the first target data minus the size of the first part of the first target data;

determining, by the primary controller, a second block among the multiple blocks, where the second block is a block that has been written with data but is not filled with data; and writing, by the primary controller, the first part of the first target data into the first block, and writing the second part of the first target data into the second block.

In a first possible implementation manner of the third aspect, the second block is a preset block.

In a second possible implementation manner of the third aspect, the second block has a data flag, and the data flag is used to identify a block that has been written with data but is not filled with data; and the determining, by the primary controller, a second block among the multiple blocks includes: determining, by the primary controller, the second block among the multiple blocks according to the data flag.

With reference to the second possible implementation manner of the third aspect, in a third possible implementation manner of the third aspect, the method further includes:

receiving, by the primary controller, second target data; and when an effective capacity of a third block among the multiple blocks is less than a size of the second target data, dividing the second target data into first part of the second target data and second part of the second target data, where a size of the first part of the second target data is the effective capacity of the third block, and a size of the second part of the second target data is the size of the second target data minus the size of the first part of the second target data;

writing, by the primary controller, the first part of the second target data into the third block, and writing the second part of the second target data into the second block; and adding, by the primary controller, the data flag to the second block.

According to a fourth aspect, an embodiment of the present invention provides a method for writing data into a flash memory apparatus, where the flash memory apparatus includes a primary controller and a flash chip, and the flash chip includes multiple blocks; and the method includes:

receiving, by the primary controller, first target data, and writing the first target data into a first block among the multiple blocks;

when the first block is filled with data, obtaining, by the primary controller, data that is in the first target data and has not been written into the first block, where an effective capacity of the first block is less than a size of the first target data;

determining, by the primary controller, a second block among the multiple blocks, where the second block is a block that has been written with data but is not filled with data; and writing, by the primary controller into the second block, the data that is in the first target data and has not been written into the first block.

In a first possible implementation manner of the fourth aspect, the second block is a preset block.

In a second possible implementation manner of the fourth aspect, the second block has a data flag, and the data flag is used to identify a block that has been written with data but is not filled with data; and the determining, by the primary controller, a second block among the multiple blocks includes: determining, by the primary controller, the second block among the multiple blocks according to the data flag.

With reference to the second possible implementation manner of the fourth aspect, in a third possible implementation manner of the fourth aspect, the method further includes: receiving, by the primary controller, second target data, and writing the second target data into a third block among the multiple blocks;

when the third block is filled with data, obtaining, by the primary controller, data that is in the second target data and has not been written into the third block, where an effective capacity of the third block is less than a size of the second target data;

writing, by the primary controller into the second block, the data that is in the second target data and has not been written into the third block; and adding, by the primary controller, the data flag to the second block.

According to a fifth aspect, an embodiment of the present invention provides a storage system, where the storage system includes the flash memory apparatus and the controller according to the first aspect or any one of the first to third possible implementation manners of the first aspect, where the controller is configured to send first target data to the flash memory apparatus.

According to a sixth aspect, an embodiment of the present invention provides a storage system, where the storage system includes the flash memory apparatus and the controller according to the second aspect or any one of the first to third possible implementation manners of the second aspect, where the controller is configured to send first target data to the flash memory apparatus.

The embodiments of the present invention provide a method for writing data into a flash memory apparatus, a flash memory apparatus, and a storage system. In the embodiments of the present invention, when an effective capacity of a first block among multiple blocks is less than a size of first target data, a primary controller of the flash memory apparatus divides the first target data into first part of the first target data and second part of the first target data, where a size of the first part of the first target data is the effective capacity of the first block, and a size of the second part of the first target data is the size of the first target data minus the size of the first part of the first target data; determines a second block among the multiple blocks, where the second block is a block that has been written with data but is not filled with data; and writes the first part of the first target data into the first block, and writes the second part of the first target data into the second block. Because the second block is a block that has been written with data but is not filled with data, according to implementation manners of the embodiments of the present invention, a part of data obtained by subtracting the effective capacity of the first block from the size of the first target data may be stored in the second block, and a new block is not selected to store this part of data, thereby improving block utilization and saving storage space of an SSD.

In addition, the embodiments of the present invention provide another method for writing data into a flash memory apparatus, another flash memory apparatus, and another storage system. In the embodiments of the present invention, a primary controller receives first target data, and writes the first target data into a first block among multiple blocks; when the first block is filled with data, the primary controller obtains data that is in the first target data and has not been written into the first block, where an effective capacity of the first block is less than a size of the first target data; the primary controller determines a second block among the multiple blocks, where the second block is a block that has been written with data but is not filled with data; and the primary controller writes, into the second block, the data that is in the first target data and has not been written into the first block. In the embodiments, the primary controller may obtain the data that is in the first target data and has not been written into the first block, and writes the data to the second block. Because the second block is a block that has been written with data but is not filled with data, according to the implementation manners of the embodiments of the present invention, a part of data obtained by subtracting the effective capacity of the first block from the size of the first target data may be stored in the second block, and a new block is not selected to store this data, thereby improving block utilization and saving storage space of an SSD.

BRIEF DESCRIPTION OF DRAWINGS

To describe the technical solutions in the embodiments of the present invention more clearly, the following briefly introduces the accompanying drawings required for describing the embodiments.

DESCRIPTION OF EMBODIMENTS

Embodiments of the present invention provide a method for writing data into a flash memory apparatus, a flash memory apparatus, and a storage system, which can improve space utilization of a block.

Figure 1:
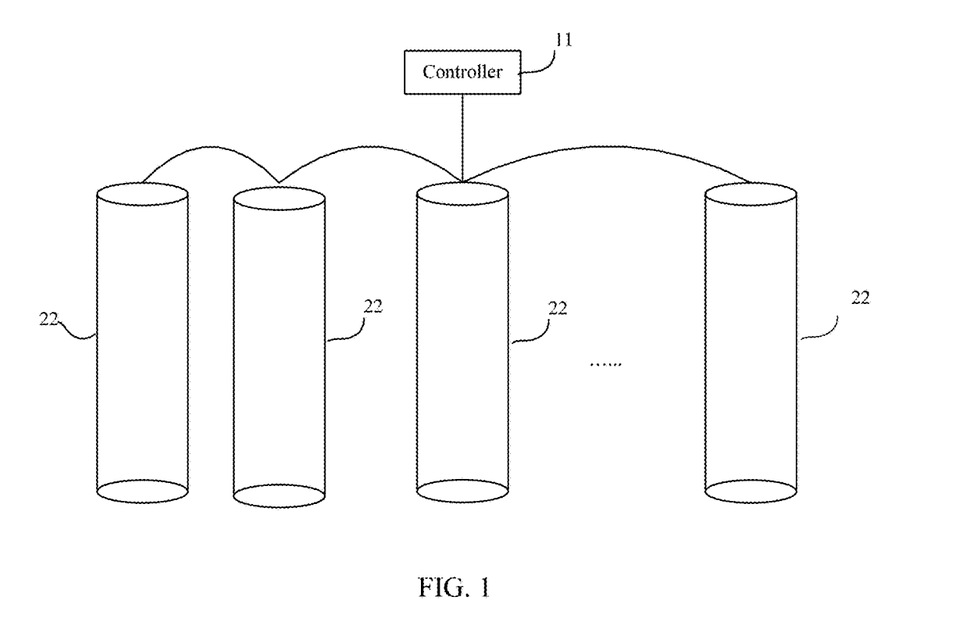
FIG. 1 is a schematic structural diagram of a storage system according to an embodiment of the present invention.

FIG. 1 depicts a schematic structural diagram of a storage system according to an embodiment of the present invention. The storage system shown in FIG. 1 includes a controller 11 and a flash memory apparatus 22. The flash memory apparatus 22, a storage apparatus that uses a Flash unit as a storage medium, may include a Solid State Device (SSD), which is also referred to as a Solid State Drive (SSD), and may further include another memory. In this embodiment, the flash memory apparatus 22 is described by using an SSD as an example.

FIG. 1 is only exemplarily illustrative and does not limit a specific networking manner, for example, both cascading tree networking and ring networking may be used as long as the controller 11 and the flash memory apparatus 22 can communicate with each other.

The controller 11 may include any computing device known in the prior art, for example, a server or a desktop computer. An operating system and other application programs are installed in the controller 11. The controller 11 may send an input/output (I/O) request to the flash memory apparatus 22. For example, a write data request is sent to the flash memory apparatus 22, so that the flash memory apparatus 22 writes to-be-written data carried in the write data request into the storage medium. It should be noted that the I/O request in this embodiment of the present invention may be a write data request or a read data request.

The flash memory apparatus 22 includes a primary controller 220 and the storage medium 221.

The primary controller 220 is configured to receive and process an I/O request from the controller 11. The storage medium 221 is configured to store data.

Figure 2:
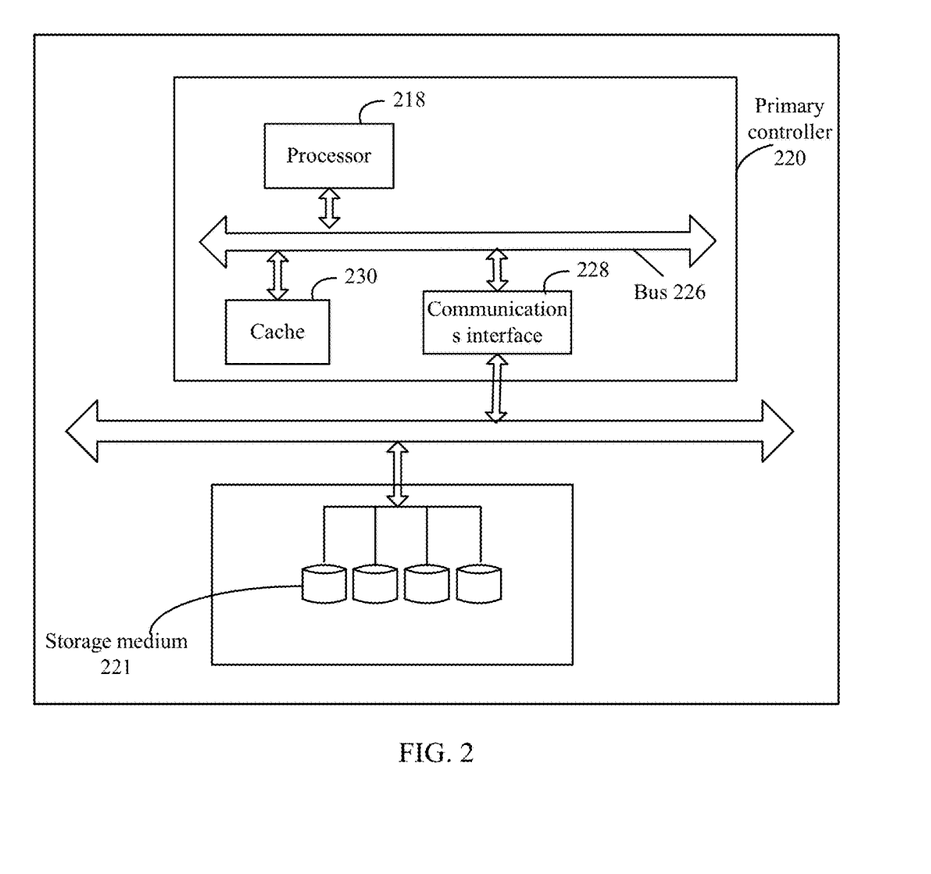
FIG. 2 is a schematic structural diagram of a primary controller of a flash memory apparatus according to an embodiment of the present invention.

Referring to FIG. 2, FIG. 2 is a schematic structural diagram of a primary controller 220 of a flash memory apparatus 22 according to an embodiment of the present invention. As shown in FIG. 2, the primary controller 220 mainly includes a processor 218, a cache 230, a communications bus (a bus for short) 226, and a communications interface 228. The processor 218, the cache 230, and the communications interface 228 complete mutual communication by using the communications bus 226.

The communications interface 228 is configured to communicate with a controller 11 or a storage medium 221.

The cache 230 is configured to temporarily store data received from the controller 11 or data read from the storage medium 221. The cache 230 may be any non-transitory machine-readable medium that can store data, such as a RAM, a ROM, a flash memory, or a Solid State Disk (SSD), which is not limited herein. For example, when a write data request sent by the controller 11 is received, the write data request may be stored in the cache 230 and is processed by the processor 218. In addition, in some application scenarios, the cache 230 may also be disposed outside the primary controller 220.

The processor 218 may be a central processing unit CPU, an application specific integrated circuit Application Specific Integrated Circuit (ASIC), or one or more integrated circuits configured to implement this embodiment of the present invention. In this embodiment of the present invention, the processor 218 may be configured to receive a write data request or a read data request from a host, process the write data request or the read data request, send the write data request or the read data request to the storage medium 221, and perform other operations.

The processor 218 may further include a buffer (not shown in the figure), configured to store various program instructions. For example, the buffer may include a Flash Translation Layer (FTL). The processor 218 may perform an operation such as collecting statistics on damaged pages by using the FTL, and store a result of the collecting statistics on damaged pages in configuration information of the FTL.

Alternatively, the processor 218 may achieve a similar function by using another software module. Therefore, any software module that has a function similar to that of the FTL and may perform an operation such as collecting statistics on damaged pages and store a result of the collecting statistics on damaged pages in configuration information of the software module fall into the protection scope of embodiments of the present invention.

In addition, the cache 230, and the cache of the processor 218 may be disposed together or separately, which is not limited in this embodiment of the present invention.

Figure 3:
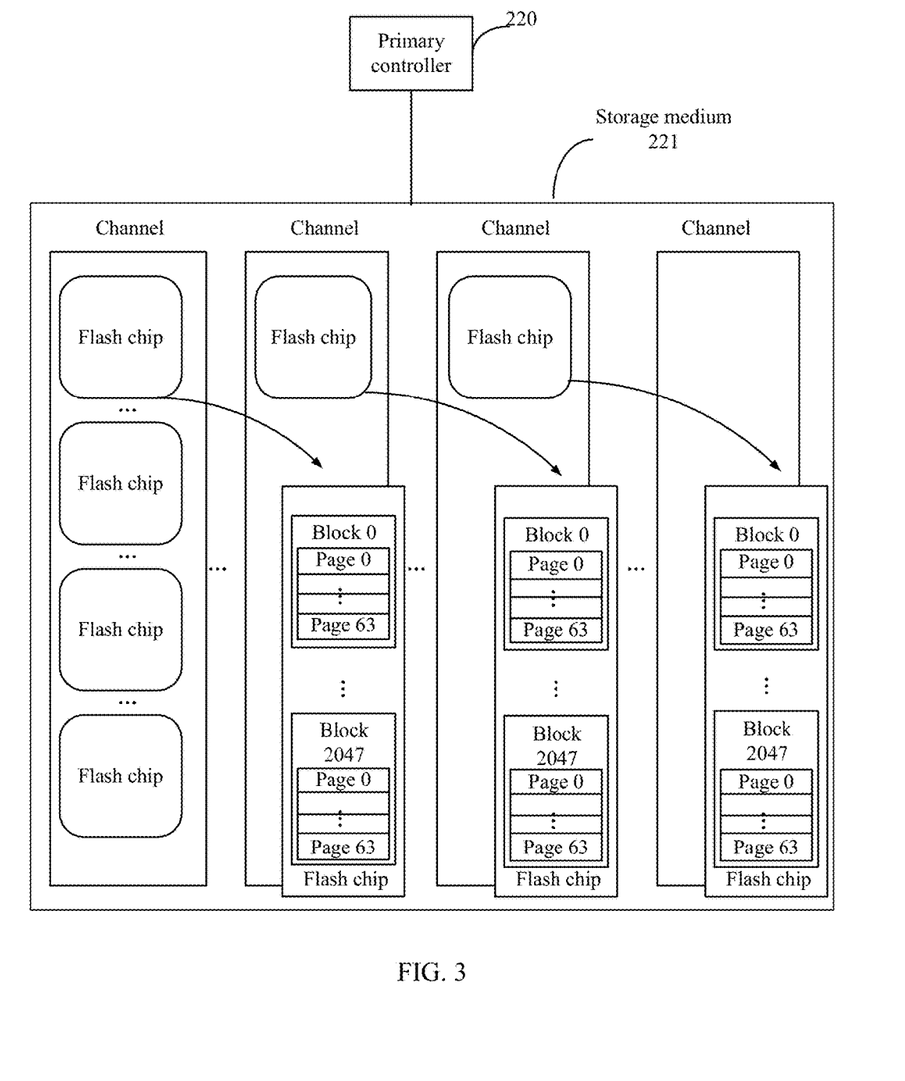
FIG. 3 is a schematic structural diagram of a storage medium of a flash memory apparatus according to an embodiment of the present invention.

Referring to FIG. 3, FIG. 3 is a schematic structural diagram of a storage medium 221 according to an embodiment of the present invention. In this embodiment, the storage medium 221 refers to a Flash unit, which may be a Single-Level Cell (SLC), a Multi-Level Cell (MLC), or another storage cell.

The storage medium 221 generally includes several flash chips. In an SSD, a channel is used to connect the several flash chips together. Concurrent processing of write data requests may be implemented for the channels. Four channels shown in FIG. 3 are used as an example. If a primary controller 220 receives four write data requests sent by a controller 11, the four channels each may process a write data request, thereby improving efficiency in processing write data requests.

Each flash chip includes several blocks, and an erase operation performed by an SSD is executed with a block as a unit. A person skilled in the art may learn that due to an erase feature of a flash unit, data stored in a block may not be directly modified like a common mechanical hard drive. When data in a block needs to be modified, the primary controller 220 of the SSD finds a new block and writes modified data into the new block, and the data in the original block becomes invalid data. When the SSD performs garbage collection, the invalid data is erased. For example, when the SSD needs to perform garbage collection, valid data in a block may be first moved to another new block, and then all data (including valid data and invalid data) stored in the original block is erased. After being erased clean, a block becomes a blank block. In this embodiment of the present invention, valid data in a block refers to data that is stored in the block and has not been modified, and this part of data may be read; and invalid data in a block refers to data that is stored in the block and has been modified, and this part of data cannot be read.

Each block may include several pages. In some cases, damage may occur in a page in a block, and a page in which damage occurs is referred to as a damaged page in this embodiment of the present invention. When there is a damaged page in a block, an actual capacity of the block is less than a capacity of a block that does not include a damaged page. In this embodiment of the present invention, an actual capacity of a block is referred to as an effective capacity. For example, a standard capacity of a block is 1 M, and a size of each page is 4 KB. When there is one damaged page in the block, an effective capacity of the block is 1 M minus 4 KB. In this embodiment of the present invention, a standard capacity of a block refers to a capacity of a blank block that does not include a damaged page, and a blank block refers to a block that is erased clean and includes neither valid data nor invalid data. An effective capacity of a block is equal to a standard capacity of the block minus a capacity of damaged pages, where the capacity of damaged pages is equal to a product of a size of each damaged page and the number of damaged pages.

In this embodiment of the present invention, a standard capacity of a block may be prestored in the controller 11 and used by the controller 11 to send, to a flash memory apparatus 22, target data whose size is the same as the standard capacity. A standard capacity of each block is the $N^{th}$ power (M) of 2, where N is a positive integer. Standard capacities of blocks may be the same or different. When standard capacities of blocks are different, values of N may be different. In this case, a size of target data sent by the controller 11 to the flash memory apparatus 22 is greater than or equal to a standard capacity of a largest block.

In addition, in this embodiment of the present invention, when the SSD processes a write data request, data is also written with a page as a unit. For example, the controller 11 sends a write data request to the primary controller 220, where the write data request carries a segment of Logical Block Address (LBA) and target data, and the LBAs are addresses that can be accessed by the controller 11. When receiving the write data request, the primary controller 220 may write the target data into a block according to a predetermined policy, and addresses of multiple pages into which the target data is written are addresses for actually storing the target data, and are also referred to as physical addresses. The SSD may establish and store a correspondence between the segment of LBAs and the addresses of the multiple pages, where the correspondence between the segment of LBAs and the addresses of the multiple pages is managed by an FTL. When the controller 11 subsequently sends a read data request to the primary controller 220 and requests to read the target data, the read data request carries the LBAs. In this case, the primary controller 220 may read out the target data according to the LBAs and the correspondence between the LBAs and the physical addresses, and return the target data to the controller 11.

Figure 4:
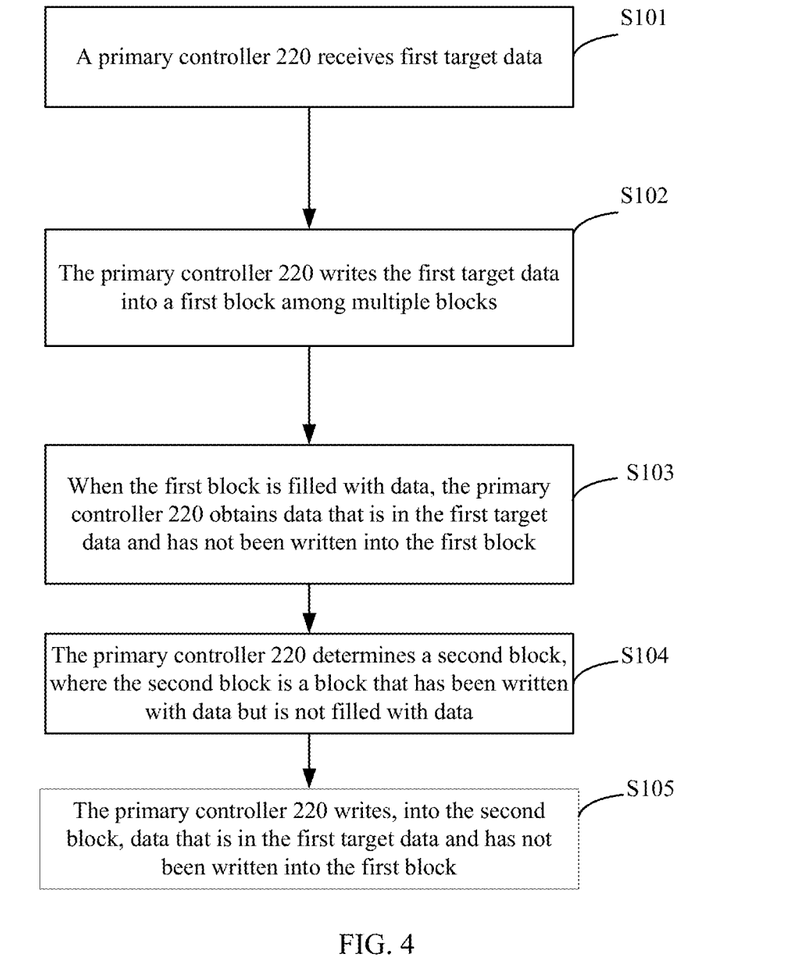
FIG. 4 is a schematic flowchart of writing data into a flash memory apparatus according to an embodiment of the present invention.

The following introduces a procedure for writing data into a flash memory apparatus according to an embodiment of the present invention. A method for writing data into a flash memory apparatus in this embodiment of the present invention may be implemented in the flash memory apparatuses shown in FIG. 2 and FIG. 3. As shown in FIG. 4, the method includes the following steps:

Step S101: A primary controller 220 receives first target data.

The first target data may be sent by a controller 11 to the primary controller 220. In addition, the first target data may be data carried in a write data request, or data carried in multiple write data requests, where a size of the first target data is the same as a standard capacity of a block. The standard capacity of a block may be prestored in the controller 11.

Specifically, step S101 may be executed by a processor 218. After receiving, through a communications interface 228, the first target data sent by the controller 11, the processor 218 may write the first target data into a cache 230.

Step S102: The primary controller 220 writes the first target data into a first block among multiple blocks.

An optional implementation manner is that: the processor 218 randomly selects a blank block, and the blank block is exactly a block that includes a damaged page. Because the first block includes a damaged page, an effective capacity of the first block is less than a standard capacity of the first block. Specifically, the effective capacity of the first block is equal to the standard capacity of the first block minus a capacity of the damaged page included in the first block.

Specifically, before the processor 218 executes step S102, statistics on information about the damaged page in the first block may not be collected, and an operation of writing data is directly performed. It may be understood that the statistics on information about the damaged page in first block may be collected in advance before the processor 218 executes the operation of writing data.

However, the first target data cannot be completely written into the first block because the size of the first target data is the standard capacity of the first block; when the first block includes a damaged page, the effective capacity of the first block is less than the standard capacity of the first block.

Figure 5:
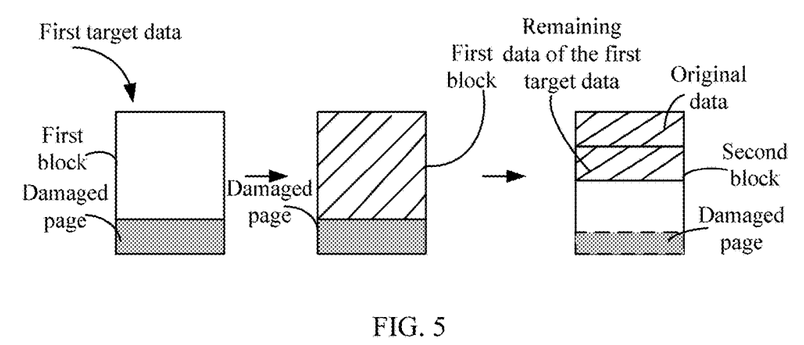
FIG. 5 is a schematic diagram of a scenario in which data is written into a flash memory apparatus according to an embodiment of the present invention.

For ease of description, reference may be made to an example shown in FIG. 5. FIG. 5 is a schematic diagram of a scenario in which data is written into a first block and a second block.

As shown in 5, first target data is written into a first block, where the first block includes a damaged page.

Step S103: When the first block is filled with data, the primary controller 220 obtains data that is in the first target data and has not been written into the first block.

Specifically, step S103 is executed by the processor 218.

A size of the data that is in the first target data and has not been written into the first block is a capacity of the damaged page in the first block. Because a size of the first target data is greater than an effective capacity of the first block, when the first block is filled with data, there is still a part of data that cannot be written into the first block, where a size of this part of data is the capacity of the damaged page in the first block. For ease of description, this part of data that cannot be written into the first block is referred to as overflow data in subsequent steps.

As shown in FIG. 5, when first target data is written into a first block, the first block is filled with data. A dashed area in the first block shown in FIG. 5 is data that is in the first target data and has been written into the first block.

Step S104: The primary controller 220 determines a second block, where the second block is a block that has been written with data but is not filled with data.

Specifically, step S104 is executed by the processor 218.

The second block may be a block that is set by the flash memory apparatus 22 during initialization and is specially used to store overflow data. Alternatively, the second block may have a data flag, where the data flag is used to identify a block that has been written with data but is not filled with data. The data flag may be an attribute of the second block, where a value of the attribute may be a number, a letter, a string of characters, or the like. This embodiment of the present invention does not set any limitation on a form of the data flag. Any flag whose function is to identify a block that has been written with data but is not filled with data shall fall within the protection scope of this embodiment of the present invention. In this way, the primary controller 220 may determine the second block according to the data flag. The data flag may be a flag that is added to a block after overflow data is stored in the block if a data overflow occurs when the flash memory apparatus 22 processes a previous write data request. After the data flag is added, the block serves as a second block and is specially used to store overflow data. Each time the flash memory apparatus 22 processes a write data operation, if a data overflow occurs, the overflow data is written into the second block. It may be understood that, when the second block is filled with data, the flash memory apparatus 22 may select a new block from the multiple blocks to serve as a second block to continue to store the overflow data. As shown in FIG. 5, data (original data shown in FIG. 5) is already stored in the second block. In addition, the second block may include a damaged page, or may not include any damaged page.

It should be noted that this embodiment uses one channel in the SSD as an example for description. For one channel in the SSD, there is only one block that has been written with data but is not filled with data. When the SSD has multiple channels, each channel has one block that has been written with data but is not filled with data. In addition, this embodiment of the present invention may also implement concurrent processing of multiple I/O requests for multiple concurrent units on one channel. In this case, each concurrent unit has only one block that has been written with data but is not filled with data.

Step S105: The primary controller 220 writes, into the second block, data that is in the first target data and has not been written into the first block.

Specifically, step S105 is executed by the processor 218.

As shown in FIG. 5, remaining data of the first target data is written into the second block.

According to this embodiment of the present invention, a primary controller 220 receives first target data, and selects a first block from multiple blocks. Because an effective capacity of the first block is less than a size of the first target data, the first block has no sufficient capacity to store the entire first target data. When the first block is filled with data, the primary controller 220 obtains data that is in the first target data and has not been written into the first block, and writes the data into a second block, where the second block is a block that has been written with data but is not filled with data. An overflow of the first target data is written into a block that has been written with data but is not filled with data, which avoids that a new blank block is found to store overflow data, thereby improving block utilization.

To further describe technical effects of the embodiments of the present invention, in the foregoing embodiment, before step S101, the primary controller 220 may further receive second target data sent by the controller 11, where a size of the second target data is the same as a standard capacity of a block. The primary controller 220 writes the second target data into a third block among the multiple blocks; and the third block, similar to the first block, is a blank block and includes a damaged page. Therefore, an effective capacity of the third block is less than a size of the second target data. When the third block is filled with data, the primary controller 220 obtains data that is in the second target data and has not been written into the third block, and writes, into the second block, the data that is in the second target data and has not been written into the third block. In addition, after writing, into the second block, the data that is in the second target data and has not been written into the third block, the primary controller 220 may add a data flag to the second block, where the data flag is used to identify that the second block is a block that has been written with data but is not filled with data. Therefore, when the primary controller 220 receives other target data subsequently, if the other target data is written into a blank block and an overflow occurs, overflow data may be written into the second block, thereby improving utilization of a block in an SSD to a greatest extent.

In addition, in the embodiment shown in FIG. 4, a preferable implementation manner is that: step S104 may be performed after step S101 to step S103. In other words, in this implementation manner, the primary controller 220 first needs to write the first target data into the first block (a blank block that includes a damaged page), and after obtaining the data that is in the first target data and has not been written into the first block, the primary controller 220 determines the second block (a block that has been written with data but is not filled with data). A benefit brought by this implementation manner is that it can be ensured that data corresponding to a segment of consecutive LBAs is stored in one block to a greatest extent.

Figure 6:
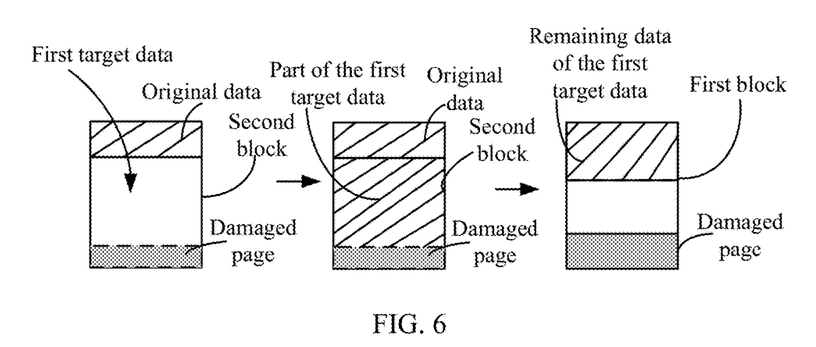
FIG. 6 is a schematic diagram of another scenario in which data is written into a flash memory apparatus according to an embodiment of the present invention.

To describe the technical effects of the foregoing implementation manner, FIG. 6 is used for comparative explanation. FIG. 6 is a schematic diagram of another scenario in which data is written into a flash memory apparatus 22 according to an embodiment. As shown in FIG. 6:

When receiving first target data, the flash memory apparatus 22 first determines a second block, and writes the first target data into the second block. Because data (referred to as original data in FIG. 6) is already stored in the second block, when being written into the second block, the first target data may be written following the original data until the second block is filled with data. Because data has already been stored in the second block and the second block may include a damaged page, the first target data cannot be completely written into the second block. When the second block is filled with data, data that is in the first target data and has not been written into the second block may be obtained, where a size of the data that is in the first target data and has not been written into the second block is a sum of a size of the original data in the second block and a capacity of a damaged page included in the second block. Then, a blank block (a first block in this embodiment of the present invention) may be selected from multiple blocks, and the data that is in the first target data and has not been written into the second block is written into the first block.

It may be learned from the foregoing description and FIG. 6 that the first target data is stored in the first block and the second block. However, a difference from the implementation manner shown in FIG. 5 is that: in the implementation manner shown in FIG. 6, both data stored in the first block and data stored in the second block is less than data stored in the first block in FIG. 5.

In addition, it may be learned according to the foregoing description that after an SSD writes target data into a block, addresses of multiple pages in the block into which the target data is written are addresses for actually storing the target data, and are also referred to as physical addresses. When the target data is stored in one block to a greatest extent, an extent to which physical addresses of the target data are consecutive is highest; and when garbage collection is performed on the block, the number of generated fragments is smallest.

Figure 7:
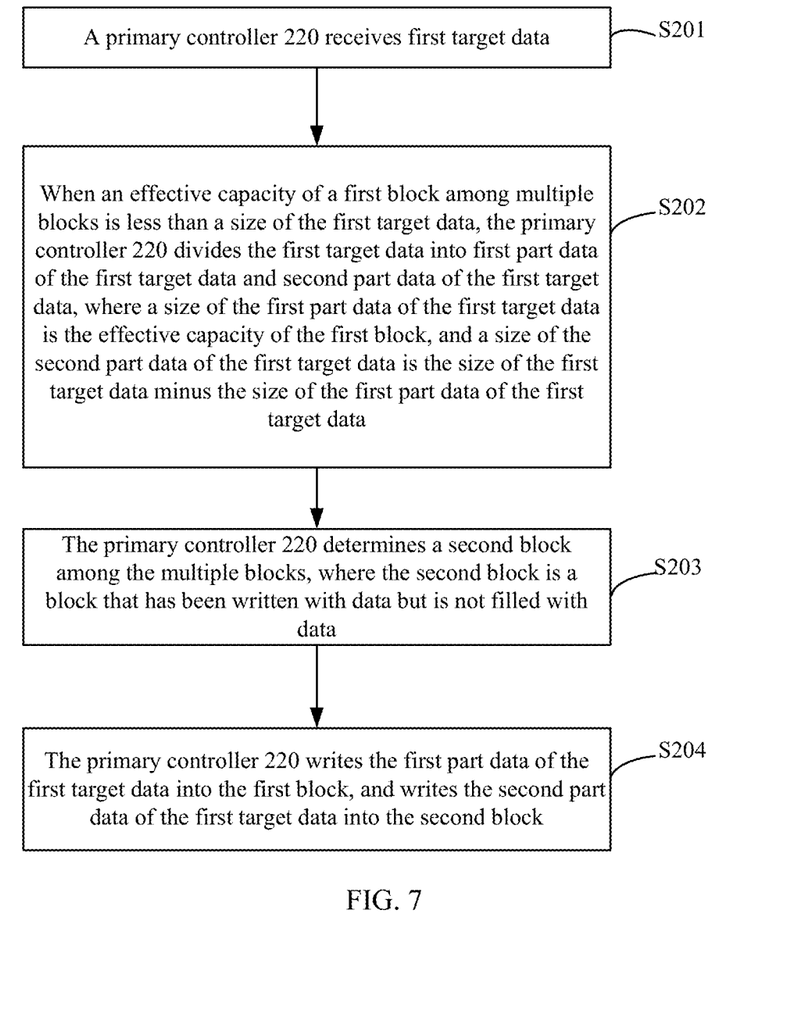
FIG. 7 is another schematic flowchart of writing data into a flash memory apparatus according to an embodiment of the present invention.

The following introduces another method procedure for writing data into a flash memory apparatus according to an embodiment of the present invention. The method may be implemented in the flash memory apparatuses shown in FIG. 2 and FIG. 3. As shown in FIG. 7, the method includes the following steps:

Step S201: Step S201 is the same as step S101 in the embodiment shown in FIG. 4, and reference may be made to the description in step S101.

Step S202: When an effective capacity of a first block among multiple blocks is less than a size of the first target data, the primary controller 220 divides the first target data into first part of the first target data and second part of the first target data, where a size of the first part of the first target data is the effective capacity of the first block, and a size of the second part of the first target data is the size of the first target data minus the size of the first part of the first target data.

When receiving the first target data, the primary controller 220 may select the first block from multiple blocks in an SSD to store the first target data, where the first block is a blank block. However, the first block may be a block that includes a damaged page. When the first block includes a damaged page, the effective capacity of the first block is less than the size of the first target data because the size of the first target data is equal to a standard capacity of a block.

Specifically, for the multiple blocks included in the SSD, a processor 218 may collect statistics on and record information about a damaged page in each block by using an FTL, where the information about a damaged page refers to information about whether a block includes a damaged page, information about the number or a capacity of damaged pages that are included, and the like.

Optionally, a processor 218 may store, in configuration information of the FTL, the information about a damaged page in each block that is obtained by means of statistics collection. When the first target data sent by a controller 11 is received, the processor 218 selects a blank block according to the information about a damaged page that is stored in the FTL. It should be noted that when selecting a blank block, the processor 218 may preferentially select, according to the information about a damaged page that is stored in the FTL, a blank block that does not include a damaged page. In this case, the processor 218 may directly write the received first target data into the blank block that does not include a damaged page.

However, a key point discussed in this embodiment of the present invention is that when the processor 218 selects a blank block that includes a damaged page. A reason may be that blank blocks that do not include damaged pages are used up, or that the processor 218 randomly selects a blank block that includes a damaged page, or there may be another reason. Details are not discussed in this embodiment of the present invention.

In addition, in this embodiment of the present invention, the processor 218 may preferentially select a blank block with less damaged pages.

When the effective capacity of the first block is less than the size of the first target data, the processor 218 may divide the first target data into the first part and the second part according to the information about a damaged page in the first block.

When the information about a damaged page is the number of damaged pages included in the first block, a capacity of the damaged pages included in the first block is the number of damaged pages multiplied by a size of each damaged page; the effective capacity of the first block is a standard capacity of the first block minus the capacity of the damaged pages, so that the size of the first part is obtained. In addition, the information about a damaged page may be the capacity of the damaged pages included in the first block, the effective capacity of the first block, or other information that may be used to obtain the effective capacity of the first block.

In addition, if the first target data is carried in a write data request sent by the controller 11 to the primary controller 220, the dividing the first target data into the first part and the second part may be specifically: dividing the write data request into two write data requests, where one write data request that is obtained after the dividing carries the first part and the other write data request carries the second part. If the first target data is carried in multiple write data requests that are sent by the controller 11 to the primary controller 220, the dividing the first target data into the first part and the second part may be specifically: dividing the multiple write data requests into two parts of write data requests, where data carried in a first part of write data requests is the first part, and data carried in a second part of write data requests is the second part.

Step S203: The primary controller 220 determines a second block among the multiple blocks, where the second block is a block that has been written with data but is not filled with data.

Specifically, step S203 is executed by the processor 218.

The second block may be a block that is set by the flash memory apparatus 22 during initialization and is specially used to store overflow data. Alternatively, the second block may have a data flag, where the data flag is used to identify a block that has been written with data but is not filled with data. In this way, the primary controller 220 may determine the second block according to the data flag. The data flag may be a flag that is added to a block after overflow data is stored in the block if a data overflow occurs when the flash memory apparatus 22 processes a previous write data request. After the data flag is added, the block serves as a second block and is specially used to store overflow data. Each time the flash memory apparatus 22 executes a write data operation, if a data overflow occurs, the overflow data is written into the second block. It may be understood that, when the second block is filled with data, the flash memory apparatus 22 may select a new block from the multiple blocks to serve as a second block to continue to store the overflow data.

It should be noted that this embodiment uses one channel in the SSD as an example for description. For one channel in the SSD, there is only one block that has been written with data but is not filled with data. When the SSD has multiple channels, each channel has one block that has been written with data but is not filled with data.

Step S204: The primary controller 220 writes the first part of the first target data into the first block, and writes the second part of the first target data into the second block.

Optionally, the processor 218 may concurrently write the two parts of data into two blocks, or first write the first part into the first block and then write the second part into the second block, or first write the second part into the second block and then write the first part into the first block, which is not limited herein.

A difference from the embodiment shown in FIG. 4 is that: in the embodiment shown in FIG. 7, before the primary controller 220 writes the first target data into the first block and the second block, the first target data needs to be divided into the first part and the second part, where the size of the first part is the same as the effective capacity of the first block, and the size of the second part is the same as the capacity of damaged pages in the first block. After the dividing is completed, the primary controller 220 writes the two parts of data into the two blocks. Because an overflow of the first target data is written into a block that has been written with data but is not filled with data, block utilization may be improved in this implementation manner.

Likewise, similar to the embodiment shown in FIG. 4, before step S201, the primary controller 220 may further receive second target data sent by the controller 11, where a size of the second target data is the same as a standard capacity of a block. When a third block among the multiple blocks is a blank block that includes a damaged page, an effective capacity of the third block is less than the size of the second target data. The primary controller 220 may divide the second target data into first part and second part, where a size of the first part is the same as the effective capacity of the third block, and a size of the second part is the size of the second target data minus the size of the first part. In addition, the primary controller 220 further needs to select, from the multiple blocks, a block that is used to store the second part, and after writing the second part into the block that is selected, the primary controller 220 may add a data flag to the block, where the data flag is used to identify that the block is a block that has been written with data but is not filled with data. The block is the second block described in the foregoing. Therefore, when the primary controller 220 receives other target data subsequently, if an overflow occurs when the other target data is written into a blank block, overflow data may be written into the second block, thereby improving utilization of a block in an SSD to a greatest extent. In addition, it should be noted that when the second block in this embodiment is filled with data, a new block may be selected as the second block, used to store an overflow of target data.

A person of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A storage system for controlling storage of data, comprising:
an array controller and a solid state disk (SSD) having a plurality of blocks, wherein the array controller is coupled with the SSD and
wherein each block includes a plurality of pages; and
wherein the array controller is configured to:
receive multiple write requests, each of the multiple write requests includes data;
store the data included in each of the multiple write requests into a cache of the array controller;
obtain target data from the cache, wherein a size of the target data is equivalent to a total capacity of a block without a bad page; and
send the obtained target data to the SSD; and
wherein the SSD is configured to:
identify a first block to store the target data, wherein an available capacity of the first block is less than a size of the target data, wherein the available capacity of the first block is determined by subtracting a reduced capacity of the first block from a total capacity of the first block, wherein the reduced capacity of the first block is caused by one or more unavailable pages in the first block;
divide the target data into two parts, wherein a size of a first part of the target data is equal to the available capacity of the first block, and wherein a size of a second part of the target data is equal to the size of the target data minus the size of the first part of the target data;
determine a second block that has stored data but is not full, wherein the second block is preset to store an overflow part of data;
write the first part of the target data into the first block; and
write the second part of the target data into the second block.

2. The storage system according to claim 1, wherein the second block has been attached to a data flag, which is used to indicate the second block has stored data but is not full; and wherein the SSD is configured to determine the second block according to the data flag.

3. A storage system for controlling storage of data, comprising:
an array controller and a solid state disk (SSD) having a plurality of blocks,
wherein each block includes a plurality of pages;
wherein the array controller is configured to:
receive multiple write requests, each of the multiple write requests includes data;
store the data included in each of the multiple write requests into a cache of the array controller;
obtain target data from the cache when a size of the target data is equivalent to a total capacity of a block without a bad page; and
send the obtained target data to the SSD; and
wherein the SSD is configured to:
identify a first block to store the target data, wherein an available capacity of the first block is less than a size of the target data, wherein the available capacity of the first block is determined by subtracting a reduced capacity of the first block from a total capacity of the first block, wherein the reduced capacity of the first block is caused by one or more unavailable pages in the first block;
obtain a overflow part of the target data by writing the target data into the first block;
determine a second block that has stored data but is not full; and
write the overflow part of the target data into the second block.

4. The storage system according to claim 3, wherein the second block has been attached to a data flag, which is used to indicate the second block has stored data but is not full; and wherein the SSD is configured to determine the second block according to the data flag.

5. The storage system according to claim 3, wherein a size of the overflow part of the target data is equal to the size of the target data minus the available capacity of the first block.

6. A method for a storage system controlling storage of data, wherein the storage system includes an array controller and a solid state disk (SSD) having a plurality of blocks, wherein each block includes a plurality of pages, the method comprising:
receiving, by the array controller, multiple write requests, each of the multiple write requests includes data;
storing, by the array controller, the data included in each of the multiple write requests into a cache of the array controller;
obtaining, by the array controller, target data from the cache when a size of target data is equivalent to a total capacity of a block without a bad page;
sending by the array controller to the SSD;
receiving, by the SSD, the target data;
identifying, by the SSD, a first block to store the target data, wherein an available capacity of the first block is less than a size of the target data, wherein the available capacity of the first block is determined by subtracting a reduced capacity of the first block from a total capacity of the first block, wherein the reduced capacity of the first block is caused by one or more unavailable pages in the first block;
dividing, by the SSD, the target data into two parts, wherein a size of a first part of the target data is equal to the available capacity of the first block, and wherein a size of a second part of the target data is equal to the size of the target data minus the size of the first part of the target data;
determining, by the SSD, a second block that has stored data but is not full;
writing, by the SSD, the first part of the target data into the first block; and
writing, by the SSD, the second part of the target data into the second block.

7. The method according to claim 6, wherein the second block has been attached to a data flag, which is used to indicate the second block has stored data but is not full; and the step of determining a second block comprises determining the second block according to the data flag.

8. A method for a storage system controlling storage of data, wherein the storage system includes an array controller and a solid state disk (SSD) having a plurality of blocks, wherein the array controller is coupled with the SSD, and wherein each block includes a plurality of pages, the method comprising:

receiving, by the array controller, multiple write requests, each of the multiple write requests includes data;

storing, by the array controller, the data included in each of the multiple write requests into a cache of the array controller;

obtaining, by the array controller, target data from the cache, wherein a size of target data is equivalent to a total capacity of a block without a bad page;

sending, by the array controller, to the SSD;

receiving, by the SSD, the target data;

identifying, by the SSD, a first block to store the target data, wherein an available capacity of the first block is less than a size of the target data, wherein the available capacity of the first block is determined by subtracting a reduced capacity of the first block from a total capacity of the first block, wherein the reduced capacity of the first block is caused by one or more unavailable pages in the first block;

obtaining, by the SSD, an overflow part of the target data by writing the target data into the first block;

determining, by the SSD, a second block that has stored data but is not full, wherein the second block is preset to store an overflow part of data; and     writing, by the SSD, the overflow part of the first target data into the second block.

9. The method according to claim 8, wherein the second block has been attached to a data flag, which is used to indicate the second block has stored data but is not full; and wherein the step of determining a second block comprises determining the second block according to the data flag.

* * * * *

UNITED STATES PATENT AND TRADEMARK OFFICE
CERTIFICATE OF CORRECTION

PATENT NO. : 10,203,899 B2
APPLICATION NO. : 14/979000
DATED : February 12, 2019
INVENTOR(S) : Zhang et al.

It is certified that error appears in the above-identified patent and that said Letters Patent is hereby corrected as shown below:

In the Claims

Column 16, Line 41 "sending by the array controller to the SSD" should read -- sending, by the array controller, to the SSD --.

Signed and Sealed this
Thirty-first Day of March, 2020

Andrei Iancu
*Director of the United States Patent and Trademark Office*